(12) United States Patent
Dorp et al.

(10) Patent No.: US 6,440,480 B2
(45) Date of Patent: *Aug. 27, 2002

(54) GELATIN REPLACEMENT BY WHEAT FIBER GEL AND STARCH

(75) Inventors: Michael vom Dorp, Mönchengladbach; Hartmut Bollinger, Neuler, both of (DE)

(73) Assignees: Cerestar Holding B. V., LA Sas Van Gent (NL); J. Rettenmaier & Sohne GmbH & Co., Ellwangen-Holzmuhle (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/287,356

(22) Filed: Apr. 7, 1999

(30) Foreign Application Priority Data

Apr. 7, 1998  (GB) .............................................. 9807331

(51) Int. Cl.⁷ .............................. A23L 1/05; A23L 1/06
(52) U.S. Cl. ...................... 426/573; 426/578; 426/607; 426/660; 426/804
(58) Field of Search ................................ 426/573, 578, 426/804, 660, 601, 607

(56) References Cited

U.S. PATENT DOCUMENTS

| | | | | |
|---|---|---|---|---|
| 2,978,446 A | * | 4/1961 | Battista et al. ............... | 260/212 |
| 3,539,365 A | * | 11/1970 | Durand et al. ............... | 260/212 |
| 3,573,058 A | * | 3/1971 | Ticonstra ......................... | 99/1 |
| 4,000,128 A | * | 12/1976 | Del Valle et al. | |
| 4,107,334 A | * | 8/1978 | Volly .......................... | 426/41 |
| 4,619,831 A | * | 10/1986 | Sharma ....................... | 426/93 |
| 4,623,549 A | * | 11/1986 | Katt et al. | |
| 4,810,518 A | * | 3/1989 | Haisman et al. | |
| 4,849,243 A | * | 7/1989 | Sreenivasan et al. | |
| 4,978,529 A | * | 12/1990 | Denick, Jr. | |
| 4,980,193 A | * | 12/1990 | Tuason, Jr. et al. .......... | 426/654 |
| 5,011,701 A | * | 4/1991 | Baer et al. .................. | 426/573 |
| 5,051,271 A | * | 9/1991 | Iyengar et al. | |
| 5,082,673 A | * | 1/1992 | Inglett .......................... | 426/21 |
| 5,104,674 A | * | 4/1992 | Chen et al. .................. | 426/573 |
| 5,110,612 A | * | 5/1992 | Quarles et al. | |
| 5,158,798 A | * | 10/1992 | Fung et al. .................. | 426/602 |
| 5,194,282 A | * | 3/1993 | Grossman et al. ........... | 426/549 |
| 5,209,942 A | * | 5/1993 | Bauer et al. ................. | 426/573 |
| 5,225,219 A | * | 7/1993 | Inglett .......................... | 426/28 |
| H1229 H | * | 9/1993 | McGinley et al. ........... | 426/654 |
| 5,308,637 A | * | 5/1994 | Richards et al. | |
| 5,441,753 A | * | 8/1995 | McGinley et al. ............. | 426/96 |
| 5,501,869 A | * | 3/1996 | Buliga et al. ................. | 426/658 |
| 5,658,609 A | * | 8/1997 | Abboud et al. .............. | 426/609 |
| 5,679,395 A | * | 10/1997 | Finocchiaro | |
| 5,736,177 A | * | 4/1998 | McGinley et al. ............. | 426/96 |
| 5,766,662 A | * | 6/1998 | Inglett ......................... | 426/481 |
| 5,769,934 A | * | 6/1998 | Ha et al. | |

FOREIGN PATENT DOCUMENTS

EP          0949295          * 10/1999

OTHER PUBLICATIONS

"Wheat Fibre—A New Generation of Dietary Fibres", Food Tech Europe, (Sep./Oct., 1996), pp. 34, 36, 38.*

* cited by examiner

Primary Examiner—Nina Bhat
(74) Attorney, Agent, or Firm—Fitch, Even, Tabin & Flannery

(57) ABSTRACT

A composition for gelatin replacement is disclosed. The composition comprises wheat fiber gel and starch. The wheat fiber gel may be Vitacel™ and the starch is a modified starch, preferably modified waxy maize starch or modified tapioca starch. The composition is used for gelatin replacement in dairy products, fermented milk products, fat spreads and margarine.

8 Claims, No Drawings

GELATIN REPLACEMENT BY WHEAT FIBER GEL AND STARCH

TECHNICAL FIELD

The present invention relates to a composition for gelatin replacement. The composition comprises wheat fiber gel and starch. The composition is used for gelatin replacement in dairy products, fermented milk products, fat spreads and margarine.

BACKGROUND OF THE INVENTION

Gelatin is obtained by hydrolysis of collagen. Collagen is the major intercellular protein found in the connective tissue of animal skins and bones. Gelatin is used for its gel forming ability. A firm gel is formed in aqueous medium. Gelatin is mainly used in foods, pharmaceutical preparations or photographic products. It is also widely used as a colloid, it is particularly effective as an emulsifier and stabilizer of emulsions and foams such as water crystals in ice cream, air in marshmallows and oils in water.

Gelatin has found wide application, and it is used in many different products. The product has a very heterogeneous composition and this may influence the characteristics. Already since a long time one is searching for gelatin replacers. Preferably such a replacer is to be made from easily obtainable (vegetable) material having a homogeneous composition and having all the essential characteristics of gelatin. The interest in this search has lately increased since the outbreak of the BSB disease. Bovine skin and bones form a major source of collagen used for gelatin production.

Wheat fiber gel is made by thermal/physical processing of wheat fiber. A special milling technique is used for treating wheat material resulting in a product containing a large proportion of microfine particles. Specific improvements are obtained by mixing the product with maltodextrin. The product so obtained is sold under the tradename Vitacel. This product is a dry powder, which readily disperses in water. Upon stirring of the dispersion the gel forms through shear forces. It is reported that wheat fiber gel can be used as a gelatin replacer in yoghurt or ice cream. (I. I. Bollinger, Food Marketing & Techn. October 1995, 4–6).

SUMMARY OF THE INVENTION

The present invention discloses a composition for use as a gelatin replacer comprising wheat fibers and modified starch. The composition may in addition thereto contain a maltodextrin having a low DE.

The modified starch in the composition is preferably modified waxy maize starch or modified tapioca starch.

The present invention also discloses dairy product, fermented milk product, fat spread or margarine comprising from 0.1 to 10% (w/w) of a gelatin replacer composition.

The invention further discloses a method for preparing a gelatin replacer comprising the steps of
mixing wheat fiber gel with starch,
thoroughly homogenizing the product at a temperature below 50° C., and optionally
drying the product.

DETAILED DESCRIPTION OF THE INVENTION

The present invention discloses a composition for use as a gelatin replacer comprising wheat fibers and modified starch. The composition may in addition thereto contain a maltodextrin having a low DE that is a DE value of below 20. A suitable product is a mixture of Vitacel® WFG HS73 (available from Rettenmaier & Söhne and which is a mixture of wheat fiber gel and maltodextrin (70:30%)) and modified starch. Preferably, the components are mixed in a ratio of from 40:60 to 80:20%. The most preferred mixture contains components in a ratio of 60:40%.

The modified starch in the composition is preferably modified waxy maize starch or modified tapioca starch. Although different types of modified starch can be used the modification is preferably a hydroxypropylation.

Although the product used in the Examples contains maltodextrin it is also possible to obtain good results without the presence of maltodextrin. The composition, which consists of wheat fiber gel, starch and maltodextrin has also some physiological advantages.

The present invention also discloses a dairy product, fermented milk product, fat spread or margarine comprising from 0.1 to 10% (w/w) of a gelatin replacer composition. The gelatin replacer composition is used to replace up to 100% of the gelatin and is used in similar amounts (w/w) as the gelatin, which is replaced.

Basically the preparation of the products is the standard preparation process wherein instead of gelatin the gelatin replacer is added. A specific advantage of the gelatin replacer is the ease of handling. The cumbersome process step of the dissolving of gelatin is omitted and the gelatin replacer is much easier to dissolve. Moreover, it is easier to produce a product of the same and constant quality.

The invention further discloses a method for preparing a gelatin replacer comprising the steps of
mixing wheat fiber gel with starch,
thoroughly homogenizing the product at a temperature below 50° C., and optionally
drying the product.
The product may be dried by spray-drying. As indicated before the starch is a modified starch, preferably modified waxy maize starch or modified tapioca starch.

EXAMPLE 1

1. Yoghurt milk was pasteurised using an UHT plant; milk, sucrose, gelatin replacer, modified starch. SMP were blended and dispersed into the milk. The process was performed using the following steps; preheating 50–52° C., homogenisation at 175–200 bar, heating 120° C. for 7" or 95° C. for 5 min., cooling to 37–44° C.

2. Incubation of the milk with culture in tanks to desired pH-value (3.7–4.6).

3. Stopping of the fermentation process by cooling to 18–32° C., add fruit preparation and blend carefully.

4. Aseptic filling and cooling to 4° C.

| Recipe yoghurt: | | |
| --- | --- | --- |
| Skimmed milk powder | 1.0% | 4.0% |
| Sucrose | 5.0% | 1.5% |
| Starch, modified* | 1.0% | — |
| Gelatin replacer | 0.5% | 0.4% |
| Whole milk | up to 100% | up to 100% |
| Culture | q.s. | 0.02% |
| Fruit preparation | 10% | 17% |

*modified starch is C☆Tex ® 06201 (Cerestar)

The product has a good mouthfeel and has the same organoleptic characteristics as the normal, gelatin based fruit yoghurt.

EXAMPLE 2

Application: Low Fat Spreads—40% Oil Content—Gelatin Replacement

1. Preparation of the 2 phases:

Water phase (Water, at replacer—C☆deLight® MD 01970—Cerestar, Gelatin replacer, Stabiliser, Salt, potassium sorbate, lactic acid and colour) preheating at 60° C. and Oil phase (Oil, emulsifier and flavour) preheating at 65° C.

2. Incorporation of the water phase slowly into the oil phase under severe agitation to build a stable pre-emulsion, preheating at 65° C.

3. Processing of the pre-emulsion on a continuous scraped surface Kombinator plant, (Schroeder-Tübeck) heating 90° C. for 25", first cooling 55° C., second cooling 12° C., first crystallisation at 300 rpm in a pin mixer unit, third cooling 15° C., second crystallisation at 420 rpm.

4. Filling at 16° C. and storage at 6° C.

Recipe Low Fat Spread

Hydrogenated vegetable oil: 24%

Refined vegetable oil: 16%

Gelatin Replacer: 2.75%

Emulsifier—Dimodan LS: 1%

Fat Replacer—Low DE maltodextrin: 4.75%

Stabiliser—Xanthan Gum: 0.075%

Salt: 0.7%

Potassium Sorbate: 0.1%

Lactic Acid: →4.75 pH

Colour and Flavour: q.s.

Water: 50%

The product has a good mouthfeel and has the same organoleptic characteristics as the normal, gelatin based low fat spread.

What is claimed is:

1. A gelatin replacer comprising:
   wheat fiber gel, obtained by thermally and physically processing wheat fiber, which consists of 70% wheat fibers comprising cellulose and 30% maltodextrin; and
   20 to 60% w/w of a modified starch which comprises at least one of waxy maize starch or hydroxypropylated tapioca starch;
   wherein the wheat fiber gel and the modified starch are present in a ratio of from 40:60 to 80:20; and
   wherein said gelatin replacer contains 28 to 56% w/w of said wheat fiber and 12 to 24% w/w of said maltodextrin.

2. A gelatin replacer according to claim 1, wherein said modified starch comprises waxy maize starch.

3. A gelatin replacer according to claim 1, wherein said modified starch comprises modified tapioca starch.

4. A gelatin replacer according to claim 1, wherein said gelatin replacer consists of 18% w/w of maltodextrin, 42% w/w of wheat fiber, and 40% w/w of hydroxypropylated waxy maize starch to hydroxypropylated tapioca starch.

5. A dairy product which comprises skimmed milk powder, sucrose, a gelatin replacer according to claim 1 to 2, fruit preparation, a culture, and whole milk.

6. A dairy product according to claim 5, wherein said dairy product comprises 4% of said skimmed milk, 1.5% of sucrose, 0.4% of said gelatin replacer, 0.2% of said culture, 17% of said fruit preparation, and the remainder up to 100% comprising said whole milk.

7. A dairy product according to claim 5, wherein said dairy product is yogurt.

8. A fat spread comprising 24% hydrogenated vegetable oil, 16% refined vegetable oil, 2.75% of a gelatin replacer according to claim 1 or 2, 1% of an emulsifier, 4.75% and a maltodextrin having a low DE, 0.075% of a stabilizer, 0.7% of salt, 0.1% of potassium sorbate, water, and lactic acid in an amount such that the fat spread has a pH of about 4.75.

* * * * *